United States Patent [19]
Hingorany

[11] 3,750,747
[45] Aug. 7, 1973

[54] HEAT EXCHANGER ASSEMBLY

[75] Inventor: Ashok Hingorany, Pawtucket, R.I.

[73] Assignee: Texas Instruments Incorporated, Dallas, Tex.

[22] Filed: Dec. 30, 1968

[21] Appl. No.: 787,718

[52] U.S. Cl................................ 165/178, 29/157.3
[51] Int. Cl................................................ F28b 9/04
[58] Field of Search............... 29/157.3, 199, 197.5; 165/83, 172, 178

[56] References Cited
UNITED STATES PATENTS

| | | | |
|---|---|---|---|
| 625,117 | 5/1899 | Martin | 29/199 X |
| 948,373 | 2/1910 | Elliott | 165/172 X |
| 2,474,038 | 6/1949 | Davignon | 29/199 X |
| 2,678,224 | 5/1954 | Kooistra | 165/178 X |
| 3,065,539 | 11/1962 | Hannegan | 29/199 X |
| 3,207,215 | 9/1965 | Whittell, Jr. | 165/178 X |
| 3,367,414 | 2/1968 | Brown et al. | 165/178 |

*Primary Examiner*—Manuel A. Antonakas
*Assistant Examiner*—Theophil W. Streule, Jr.
*Attorney*—Harold Levine, Edward J. Connors, Jr., John A. Haug and James P. McAndrews

[57] ABSTRACT

A heat-exchanger end plate assembly is shown to comprise a metal plate member embodying a heat-conductive layer and a surface layer of solder, the plate having a plurality of apertures in which metal tubes are disposed. The solder layer is adhered to the tubes completely around the tube peripheries for sealing the apertures around the tubes. Where the heat-conductive layer material is formed of a material which is incompatible with the solder material at the melting temperature of the solder material, as where the heat-conductive layer is formed of copper and the solder has a copper constituent, an intermediate metal layer of steel or the like is metallurgically bonded to the heat-conductive layer and is adhered to the solder layer. A method for making the heat exchanger assembly is also shown.

7 Claims, 3 Drawing Figures

PATENTED AUG 7 1973　　　　　　　　3,750,747

INVENTOR,
Ashok Hingorany,
BY
James P. McAndrews
Att'y.

HEAT EXCHANGER ASSEMBLY

Prior to the present invention, heat exchanger end plate assemblies embodying a multiplicity of copper tubes sealed within respective apertures in a copper end plate have been formed by disposing the tubes in respective apertures and by depositing sufficient solder material in molten condition around each tube periphery to secure the tube in its respective plate aperture for sealing the aperture. As will be understood, such end plate assemblies can be mounted at the end of a tank containing heat-exchanger fluid with the periphery of the end plate sealed to the tank so that the tubes extend from the tank in sealed relation to the plate. When the above-described method of end plate assembly has been used, the method has been expensive and time-consuming and has resulted in rejection of a large proportion of the assemblies produced by the method due to leaking of fluid around the periphery of one or more tubes in each assembly.

It is an object of this invention to provide a novel and improved plate material for use in making heat-exchanger end plate assemblies; to provide such a novel and improved plate which can be used for forming such assemblies in an inexpensive and convenient manner with high reliability; to provide novel and improved heat-exchanger end plate assemblies.

Briefly described, the novel and improved plate material of this invention comprises a plurality of metal layers which are bonded together to form a laminate, the material having one layer which is selected for its high heat-conductivity properties and another surface metal layer which is formed of solder material. Preferably, where the metal of high heat-conductivity is incompatible with the solder layer material at the melting temperature of the solder material, the plate material incorporates an intermediate metal layer which is metallurgically bonded to the metal layer of high heat-conductivity and which is adhered to the solder layer. In forming a heat-exchanger end plate assembly utilizing this novel and improved plate material, a plurality of metal tubes are disposed in respective apertures formed in the plate material. The plate material and tubes are then heated for melting the solder material of the plate so that the solder material adheres to the tubes completely around the peripheries of the tubes for sealing the tubes within the plate apertures. Preferably the plate and tubes are heated by applying heat thereto from the side opposite the solder layer of the plate material so that the solder material, as it is melted, is drawn into the plate apertures around the tube peripheries by capillary action.

Other objects, advantages and details of the novel and improved plate materials, assemblies and methods of this invention appear in the following detailed description of preferred embodiments of the invention, the detailed description referring to the drawings in which.

Figure 2:
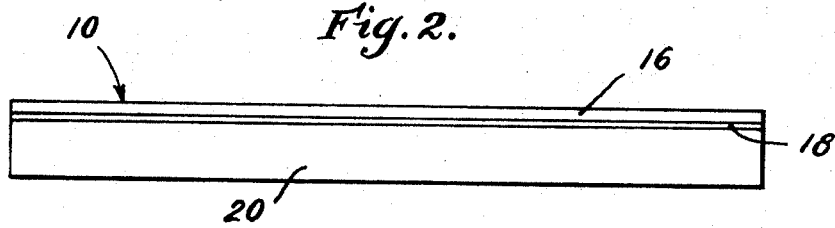
FIG. 2 is a side elevation view of the novel plate material of this invention.

Referring to the drawings, 10 in FIG. 2 indicates a preferred embodiment of the novel and improved plate material of this invention which is shown to include a surface metal layer 16 formed of a solder material, an intermediate metal layer 18, and a metal layer 20 formed of a material of selected, relatively high heat-conductivity properties. In accordance with this invention, the intermediate metal layer is preferably pressure-welded or roll-bonded to the metal layer 20 by any conventional means, such as described in U. S. Pat. No. 2,691,815 issued to H. Boessenkool et al on Oct. 10, 1954, so that the layer 18 is metallurgically bonded to the layer 20. That is, the metal layer 18 is preferably bonded to the layer 20 by means of interatomic attractive forces between the materials of the layers 18 and 20. The metal layer 16 may also be pressure-welded or roll-bonded to the intermediate layer 18, if desired, but can also be adhered to the intermediate layer by applying molten solder material of layer 16 to the intermediate layer and by permitting the solder material to cool and solidify in situ on the intermediate layer 18. In this way, the metal layers 16, 18 and 20 are each bonded together to form the composite laminate plate material 10.

In accordance with this invention, the metal layer 20 of the plate material 10 may be formed of any metal material of suitable heat-conductivity properties, but is preferably formed of copper. The solder layer of the plate material 10 can also be formed of any suitable material of low melting temperature within the scope of this invention but is preferably formed of a copper-bearing solder alloy selected from the group consisting of an alloy embodying about 72 percent silver, and 28 percent copper, an alloy embodying about 45 percent silver, 15 percent copper, 16 percent zinc and 24 percent cadmium and an alloy embodying about 52 percent silver, 16 percent copper, 15.5 percent zinc and 16.5 percent cadmium. The intermediate layer 18 may be formed of any suitable solderable material which can be bonded to the material of layer 20, the material of layer 18 being selected to be compatible with the solder material at the melting temperature of the solder material. For example, where the metal layer 20 is formed of copper and the solder layer has a copper constituent, the intermediate layer 18 is preferably formed of steel. The layer 18 can be formed of any steel, nickel, nickel alloy or the like within the scope of this invention. In this regard, note that the term "compatible" as used herein means that the material of layer 18 does not tend to dissolve into or to alloy with the solder material of layer 16 to any significant extent when the solder material is melted in contact with the intermediate layer 18. In a preferred embodiment of the plate material 10, the metal layer 20 can be of any desired thickness, but the solder layer 16 is preferably kept within the range of thickness from about 0.002 inches to 0.060 inches while the thickness of the intermediate layer 18 is preferably kept in the range from 0.001 to 0.005 inches.

Figure 1:
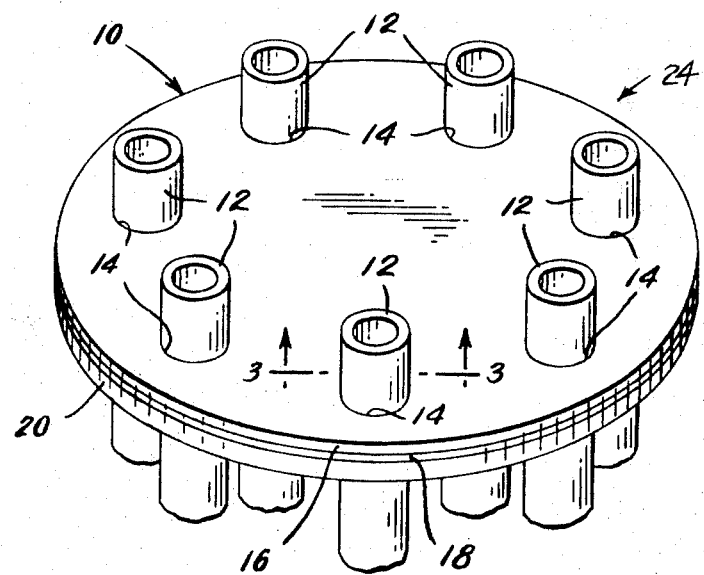
FIG. 1 is a perspective view of the heat-exchanger end plate assembly of this invention.
Figure 3:
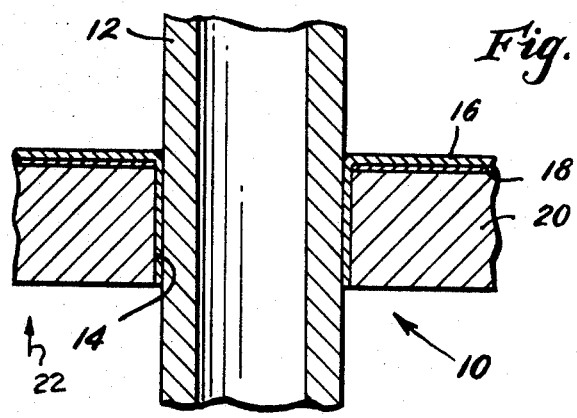
FIG. 3 is a partial section view to enlarged scale along line 3—3 of FIG. 1.

In accordance with this invention as illustrated in FIG. 1, the plate material 10 is provided with a plurality of apertures 14 in any conventional manner and the metal tubes 12 are respectively disposed in the plate apertures. As illustrated, the plate apertures extend through each of the layers of the plate material and are of a proper size to snugly receive the tubes 12 therein. In a preferred embodiment of this invention, where the plate material embodies layers of copper, steel and copper-bearing solder as above described, the tubes 12 are also preferably formed of copper. In accordance with this invention, the plate 10 and tubes 12 are then heated in any conventional manner for melting the solder layer 16 of the plate material so that the solder material flows into the plate apertures 14 around the peripheries of the tubes 12 for adhering to the tubes completely around the tube peripheries, thereby to seal the plate apertures around the tubes. Preferably as indicated by the arrow 22 in FIG. 3, the plate 10 and tubes 12 are heated from the side of the plate opposite from the solder layer 16 of the plate material. This establishes a temperature differential between the opposite sides of the plate 10 with the higher temperature side being opposite from the solder layer side of the plate. This facilitates drawing of the melted solder material 16 into the plate apertures 14 by capillary action as is illustrated in FIG. 3. As will be understood, the solder material is thereafter permitted to cool and solidify to form the heat-exchanger end plate assembly 24 illustrated in FIG. 1.

It will be understood that, in the method above described, a very large number of tubes 12 can be embodied in closely-spaced side-by-side relation extending through a plate member but that the tubes can all be simultaneously and uniformly soldered in the respective plate member apertures in a single heating and cooling operation. This is substantially less expensive and is much more convenient than the prior art process for forming such heat-exchanger end plate assemblies. Most important, the method of this invention is much more reliable than the prior art process and consistently produces assemblies which are leak-free as initially formed and which remain reliably leak-free during long periods of use. In this regard, it will be understood that, where the plate 10 embodied in the assembly is relatively large, some difficulty may be experienced in heating the assembly components uniformly so that the solder material 16 reaches melting temperature on all parts of the plate at approximately the same time. However, in using the plate material 10 as above described, the intermediate layer 18 of the plate is selected for its compatibility with the solder material so that, even though molten solder material may be in contact with the intermediate layer on one portion of the plate for a substantial period of time while the solder is being melted on other portions of the plate, no significant dissolution of the intermediate layer 18 and no significant alloying between the materials of layer 16 and 18 can occur. In this regard note that where the heat-conductive layer 20 is formed of copper as above described, such a material would be incompatible with a copper-bearing solder in the plate layer 16. If the molten solder material were permitted to contact the heat-conductive layer for any appreciable period of time, some dissolution of the heat-conductive layers could occur and alloying between the heat-conducting layer material and the solder material could undesirably raise or lower the melting temperature of the solder. However, when the intermediate layer material 18 is selected in the manner above described such dissolution of the plate materials and such altering of the solder melting temperature are avoided.

It should be understood that although a particular three-layer embodiment of the plate material of this invention has been described above by way of illustration, plate materials having other number of layers are also within the scope of this invention. For example, particularly where small plate members which can be uniformly heated at one time are used, the intermediate layer 18 may be omitted from the plate material 10 so that the solder surface layer 16 is bonded directly to the heat-conductive layer 20 of the plate material. Alternatively, solder layer 16 could be bonded directly to the heat conductive layer 20 on both sides of the heat-conductive layer. Further, intermediate layers 18, each bonded to respective solder layers 16 could be metallurgically bonded to the heat-conductive layer 20 at respective opposite sides of the heat-conductive layer within the scope of this invention. It should be understood that this invention includes all modifications and equivalents of the illustrated plate materials, methods and assemblies which fall within the scope of the appended claims.

I claim:

1. A heat exchanger end plate assembly comprising a metal plate member embodying a plurality of metal layers bonded together to form a laminate, said plate member including a metal layer of selected heat conductivity properties and at least one surface metal layer of solder material, said plate member having a plurality of apertures therein extending through each of said layers, and a plurality of metal tubes respectively disposed in said plate member apertures, said solder layer material of said plate member extending through the lengths of said apertures and being adhered to said tubes completely around the peripheries of said tubes for sealing said apertures around said tubes.

2. An assembly as set forth in claim 1 wherein said plate member embodies a single solder layer bonded to said layer of selected heat-conductivity properties and wherein said metal tubes each extend from opposite sides of said plate member.

3. An assembly as set forth in claim 1 wherein said plate member layer of selected heat-conductivity properties is incompatible with said plate member solder layer material at the melting temperature of said solder material, said plate member embodying an intermediate metal layer of solderable material which is compatible with said solder material at the melting temperature of said solder material, said intermediate layer being metallurgically bonded to said layer of selected heat-conductivity properties and adhered to said plate member solder layer and wherein said metal tubes each extend from opposite sides of said plate member.

4. An assembly as set forth in claim 3 wherein said plate member layer of selected heat-conductivity properties is formed of copper, said solder layer embodies an alloy having copper as a constituent thereof, and said intermediate layer is formed of steel, said tubes being formed of copper.

5. An assembly as set forth in claim 4 wherein said solder layer comprises a material selected from the group consisting of an alloy embodying about 72 percent silver and 28 percent copper, an alloy embodying about 45 percent silver, 15 percent copper, 16 percent zinc and 24 percent cadmium, and an alloy embodying about 52 percent silver, 16 percent copper, 15.5 percent zinc and 16.5 percent cadmium.

6. An assembly as set forth in claim 1 wherein said plate member embodies a solder surface layer adhered to each side of said plate member layer of selected heat-conductivity properties.

7. An assembly as set forth in claim 1 wherein said plate member layer of said selected heat-conductivity properties is incompatible with said plate member solder layer material, said plate member embodying an intermediate layer of solderable material metallurgically bonded to each side of plate member layer of selected heat-conductivity properties, said plate member having a layer of solder material adhered to each of said intermediate layers of said plate member and wherein said metal tubes each extend from opposite sides of said plate member.

* * * * *